(12) United States Patent
Taylor

(10) Patent No.: US 7,269,128 B2
(45) Date of Patent: Sep. 11, 2007

(54) SYSTEM AND METHOD FOR PROACTIVE SCHEDULING OF SYSTEM MAINTENANCE

(75) Inventor: William S Taylor, Duluth, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 1135 days.

(21) Appl. No.: 10/136,046

(22) Filed: May 1, 2002

(65) Prior Publication Data

US 2003/0206544 A1 Nov. 6, 2003

(51) Int. Cl.
- *G01R 31/08* (2006.01)
- *G06F 11/00* (2006.01)
- *G06F 15/173* (2006.01)
- *H04L 1/00* (2006.01)
- *H04L 12/26* (2006.01)
- *H04J 15/00* (2006.01)

(52) U.S. Cl. .................. 370/216; 370/241; 370/546; 709/224

(58) Field of Classification Search .............. 370/216, 370/241, 546; 709/223–224
See application file for complete search history.

(56) References Cited

U.S. PATENT DOCUMENTS 7,093,251 B2 * 8/2006 Tsun et al. ............... 718/100

* cited by examiner

*Primary Examiner*—Kevin C. Harper
(74) *Attorney, Agent, or Firm*—Lee & Hayes, PLLC

(57) ABSTRACT

A system for planning maintenance activities in a communication network is provided. The system comprises a query execution module, an out of sync record generator module, and a network maintenance function command module. The query execution module is operative to search a database to identify elements in the network that are out of sync. The out of sync record generator module is operative to record the identity of all the elements identified by the query execution module as being out of sync. The network maintenance function command module is operative to issue a series of commands wherein each command is operative to cause one of the out of sync elements to become in sync. The command module is also operative to issue the commands during a scheduled maintenance window.

22 Claims, 7 Drawing Sheets

SYSTEM AND METHOD FOR PROACTIVE SCHEDULING OF SYSTEM MAINTENANCE

BACKGROUND

1. Field of the Invention

This invention relates generally to telecommunication networks. More particularly, the invention relates to a system and method for proactively maintaining a telecommunications network.

2. Description of the Related Art

Proactive maintenance in a telecommunications network allows network operators to anticipate where problems may occur in the future and to act proactively to prevent some customer problems from occurring. Proactive activities may also allow a network operator to determine if and to help ensure that network performance service level agreements (SLAs) are being met and will continue to be met. Proactive activities may include identifying current and potential bottlenecks, inefficient or poorly performing components, potential failures, and others.

A number of transport networks utilize the NavisCore™ system developed by Lucent as an element management system. With the NavisCore™ system, a network operator can manually PRAM elements in the network that are in an out-of-sync ("OOS") state to return these OOS elements to an in-sync state. But, before an operator can PRAM an element the operator must manually perform a check to locate OOS elements. After identifying an OOS element, the operator then must manually issue the PRAM command to return the card to an in-sync state. The operator typically has a short window of time each week in which to PRAM any out-of-sync elements. It is difficult for an operator to manually search for all of the OOS elements and to PRAM the OOS elements during the maintenance window. Moreover, it would be more difficult to manually search for the OOS elements and to employ some type of prioritization scheme to determine the order in which OOS elements are PRAMed.

SUMMARY

A system for performing maintenance during a maintenance window is provided. In accordance with one aspect of the invention defined by the claims, a system for planning maintenance activities in a communication network is provided. The system comprises a query execution module, an out of sync record generator module, and a network maintenance function command module. The query execution module is operative to search a database to identify elements in the network that are out of sync. The out of sync record generator module is operative to record the identity of all the elements identified by the query execution module as being out of sync. The network maintenance function command module is operative to issue a series of commands wherein each command is operative to cause one of the out of sync elements to become in sync. The command module is also operative to issue the commands during a scheduled maintenance window.

In accordance with another aspect of the invention defined by the claims, a system for planning maintenance activities in a communication network is provided. The system comprises a query execution module, an out of sync record generator module, a prioritizing module, and a network maintenance function command module. The query execution module is operative to search a database to identify elements in the network that are out of sync. The out of sync record generator module is operative to record the identity of all the elements identified by the query execution module as being out of sync. The prioritizing module is operative to assign a priority value to the out of sync elements in accordance with prioritizing rules. The network maintenance function command module is operative to issue a series of commands wherein each command is operative to cause one of the out of sync elements to become in sync. The command module is operative to issue the commands in an order that corresponds to the priority assigned to the out of sync elements by the prioritizing module. The command module is also operative to issue the commands during a scheduled maintenance window.

In accordance with another aspect of the invention defined by the claims, a method is provided for performing maintenance activities during a maintenance window. The method comprises the steps of querying a database to identify elements that are out of sync, recording the identity of the identified out of sync elements, and providing appropriate parameters, during a maintenance window, that allow the out of sync elements to be brought back into sync.

In accordance with another aspect of the invention defined by the claims, a method is provided for performing maintenance activities during a maintenance window. The method comprises the steps of querying a database to identify elements that are out of sync, recording the identity of the identified out of sync elements, ordering the out of sync elements in accordance with prioritizing rules, and providing appropriate parameters, during a maintenance window, that allow the out of sync elements to be brought back into sync.

BRIEF DESCRIPTION OF THE DRAWINGS

In order that the invention identified in the claims may be more clearly understood, preferred embodiments of structures, systems and methods having elements corresponding to elements of the invention recited in the claims will be described in detail by way of example, with reference to the accompanying drawings, in which:

DETAILED DESCRIPTION

Figure 1:
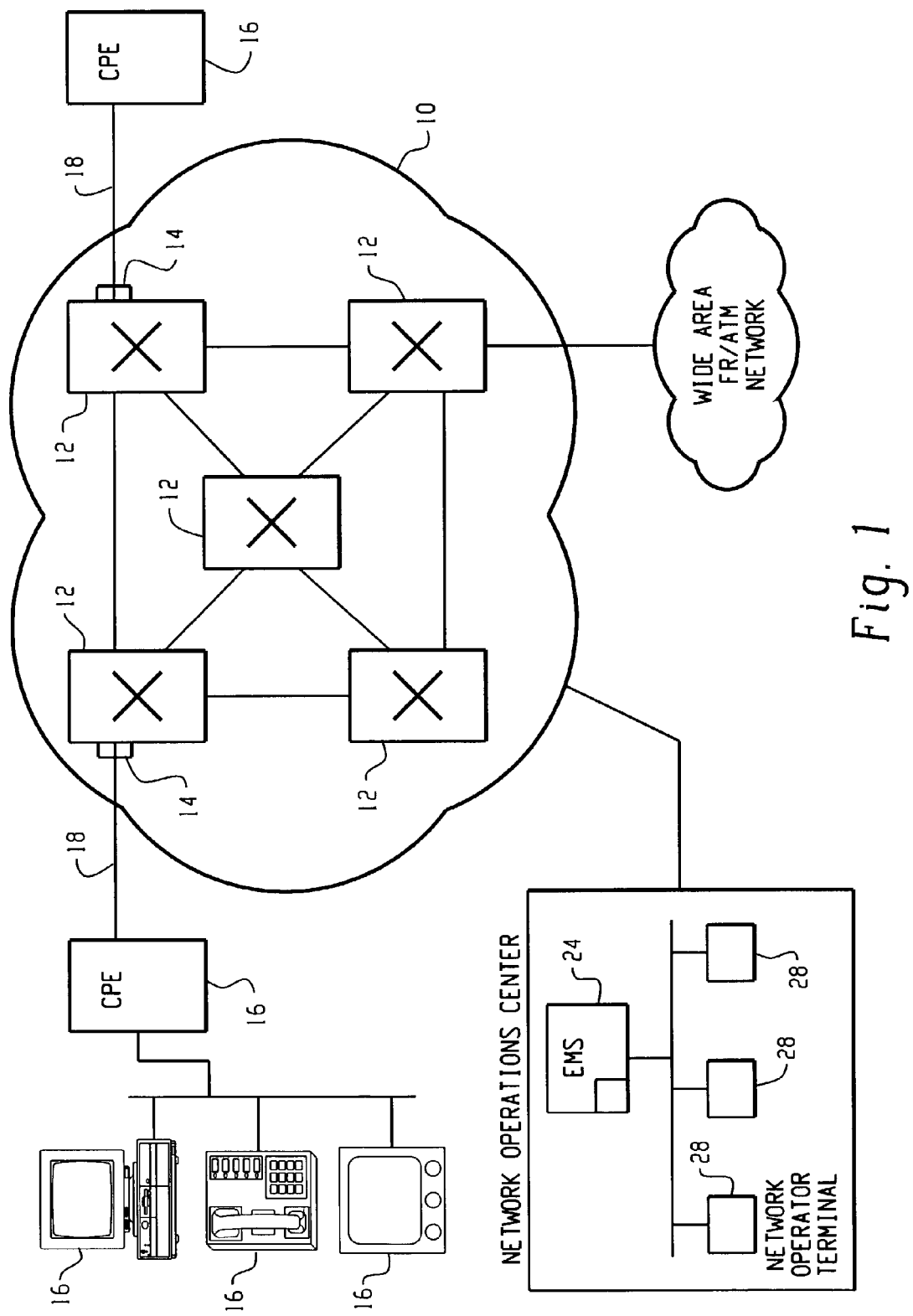
FIG. 1 is a schematic diagram of a portion of an exemplary transport network.

Referring now to the drawings, FIG. 1 is a schematic diagram illustrating an exemplary section of an FR/ATM transport network 10. The transport network 10 comprises a plurality of switching network elements 12 that are coupled together. The switching network elements 12 include a plurality of network physical ports ("PPORTs") 14 that allow equipment outside of the network to communicate over the network. The PPORTs 14 typically serve as the entry point for customer premises equipment ("CPE") 16, such as conventional telephones, facsimile machines, private branch exchanges, voice mail systems, key telephone systems, computers, modems, telephone answering machines, alarm systems, and radio control systems, as well as many other devices, to communicate via the network. A full-duplex communication line 18 provides the communication path between the PPORTs 14 and the CPE 16.

Figure 2B:
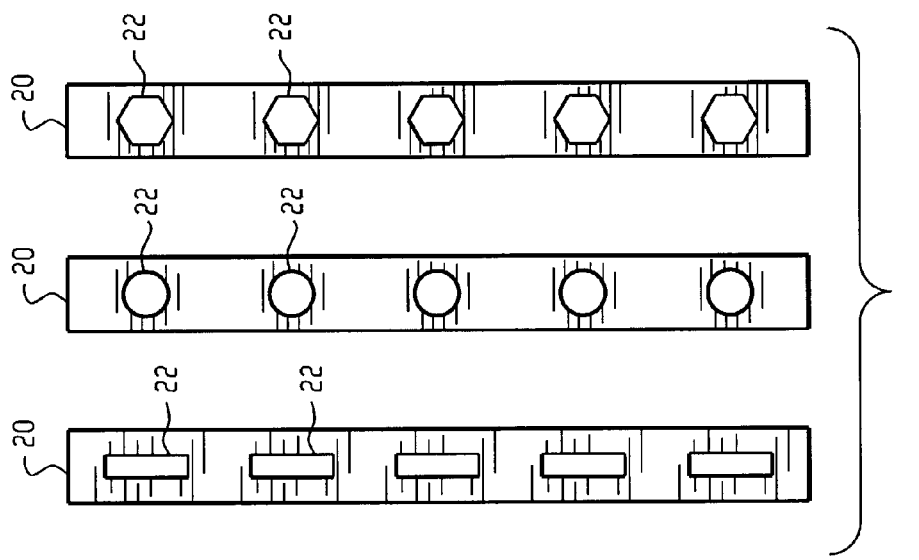
FIGS. 2A & 2B are schematic diagrams of switch hardware wherein transport connectors associated with individual cards are shown.
Figure 2A:
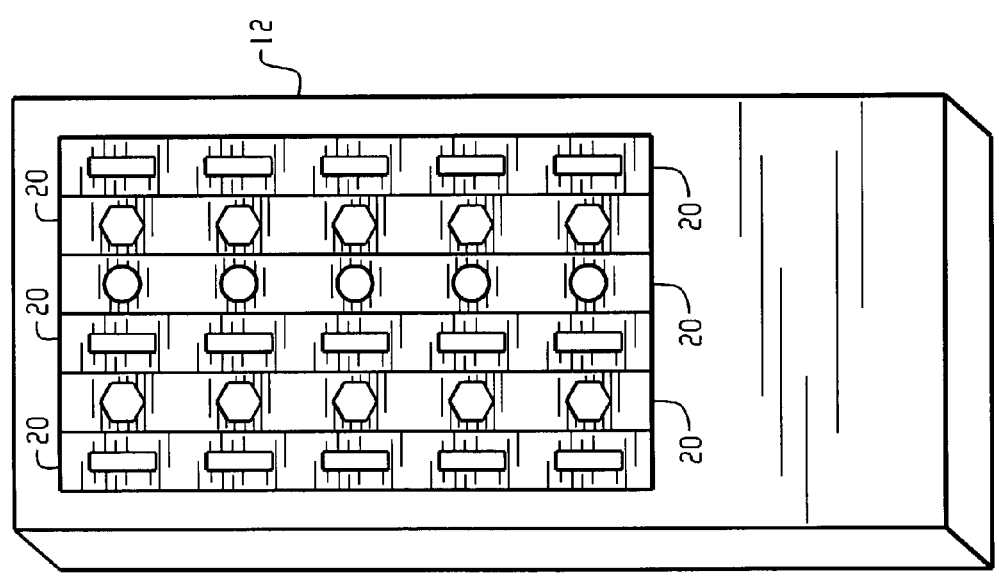

As illustrated in FIGS. 2A and 2B, the switching network elements 12 preferably are rack-based microprocessor controlled systems having a plurality of circuit boards or cards 20. Many of the cards 20 include connectors 22 which are the physical connection points for the PPORTS provided by the cards 20. The cards 22 also include parameter random access memory (PRAM) for storing switch parameters used by the cards when equipment, services, and facilities provided by the cards 22 are provisioned in the network 10.

Referring back to FIG. 1, also, coupled to the network 10 is an element management system ("EMS") 24 preferably located in a network operations center 26. The EMS 24 is a platform that allows a network operator to provision various equipment and facilities within the network 10 preferably using a network operator terminal 28.

The preferred EMS 24 is the NavisCore™ system developed by Lucent. NavisCore™ is a centralized service and network management application that delivers management and control functions for various multiservice products, such as frame relay, SMDS, ATM, and IP switch networks, on a single platform. NavisCore™ is a fully distributed and multiservice element manager. NavisCore™ is a graphically integrated UNIX-based platform that resides on Hewlett Packard's OpenView. It provides a complete network management solution based on Telecommunications Network Management (TNM) standards.

Figure 3:
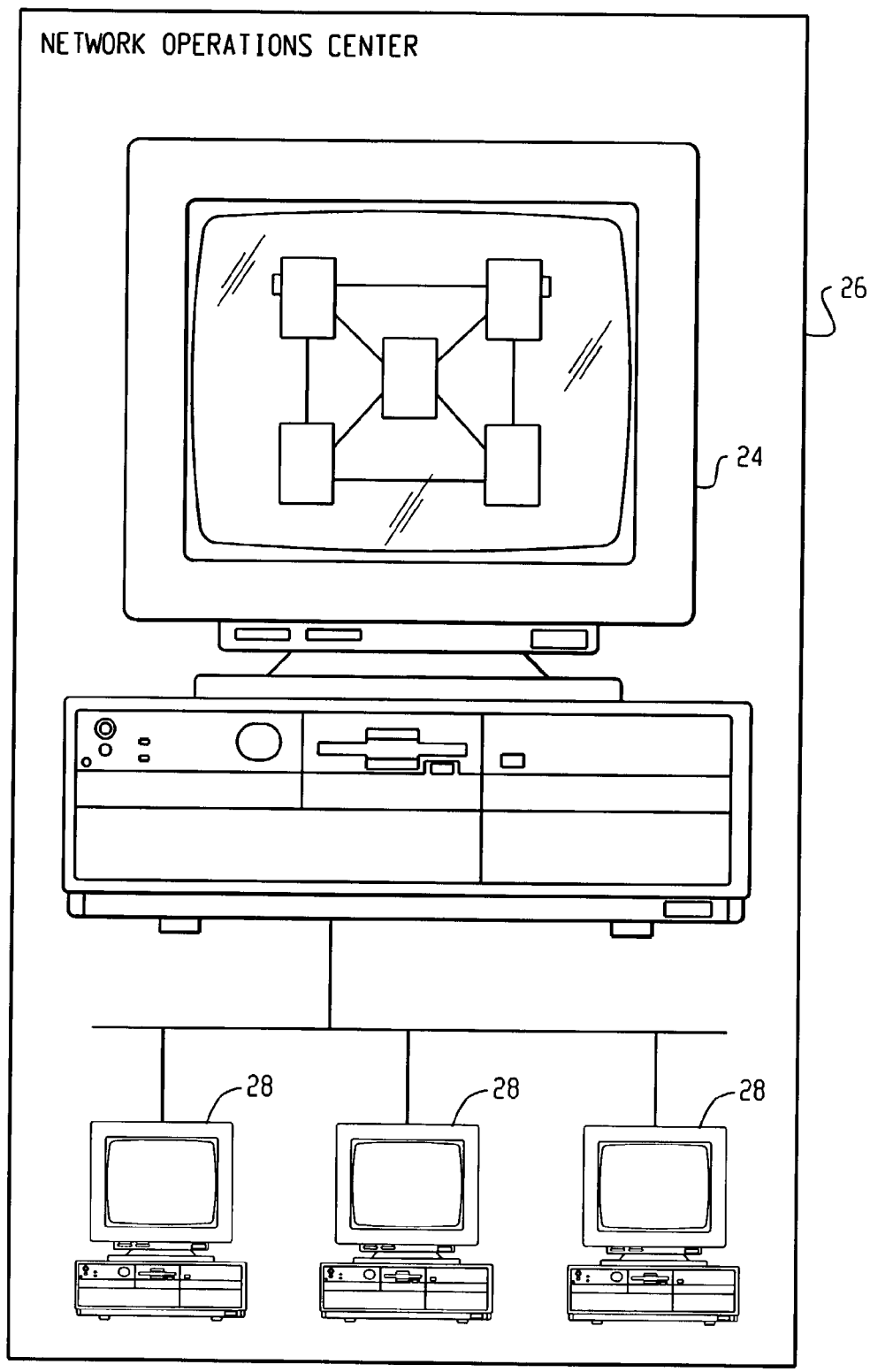
FIG. 3 is a schematic diagram of an exemplary network operation center that has an element management system.

The EMS 24 establishes a virtual channel ("VC") 30 with various network elements within the network 10 including the switching elements 12. The VCs 30 provide communication paths that allow a network operator to provision equipment and facilities in the network 10 using the EMS 24 and to monitor the status and performance of the equipment and facilities in the network 10. The EMS 24 also maintains a record of the configuration of the network and the status of all the equipment and facilities in the network 10, as illustrated in FIG. 3. Each of the network elements ("NEs"), on demand or when a condition occurs that requires communication, communicates network performance information to the EMS via the VCs 30. Network operators obtain information regarding network performance preferably using the EMS 24. The EMS obtains information regarding network performance via the VCs established with various NEs.

Figure 4:
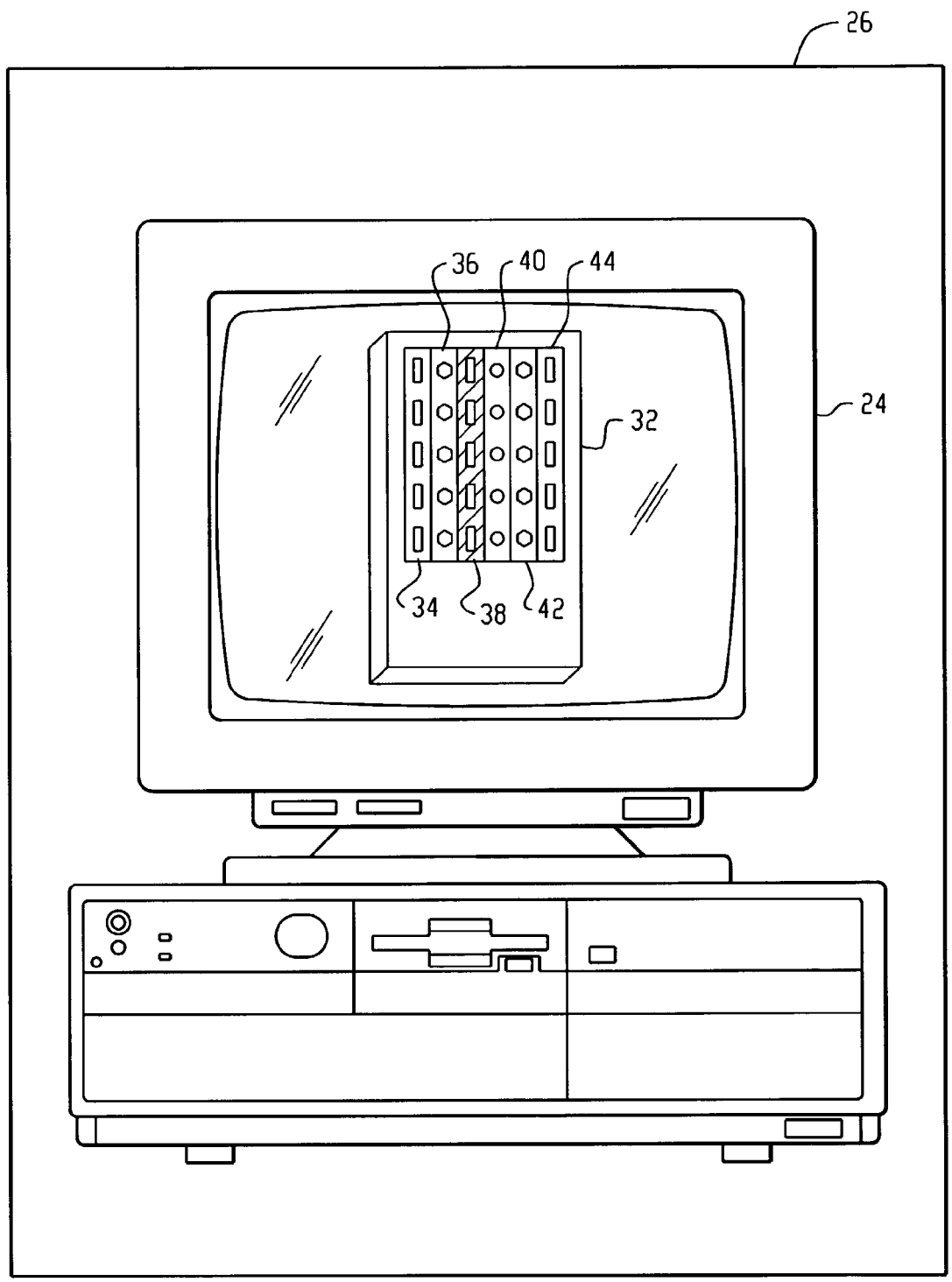
FIG. 4 is another schematic diagram of an exemplary networks operation center that has an element management system.

As illustrated in FIG. 4, the EMS 24 is also capable of checking the status of various network elements 32 including the status of individual cards 34, 36, 38, 40, 42, and 44 contained in the network elements 32. The EMS 24 includes a copy of the configuration of all the network elements, switches, cards, and customer connections as well as a copy of the switch parameters that should be loaded in the PRAM in the cards 34, 36, 38, 40, 42, and 44. The EMS 24 is capable of determining if a condition exists with respect to one or more of the cards 34, 36, 38, 40, 42, and 44 wherein the configuration of the card is different from the configuration for the card that is stored in the EMS 24. If a card is found to have a different configuration, then the card is known to be in an out-of-sync ("OOS") state. In the illustration in FIG. 4, the third card 38 is in an OOS state.

Most maintenance activities with respect to the network 10 are performed on a reactive basis. For example, when a customer problem is detected, network operators react to the problem and dispatch service technicians to determine and isolate the problem. Efforts are being made to allow network operators to proactively maintain the network before a customer detects a problem such as a loss of service or degraded service.

Proactive maintenance allows the network operators to anticipate where problems may occur in the future and to act proactively to prevent some customer problems from occurring. Proactive maintenance activities may also allow a network operator to determine if and help ensure that network performance service level agreements or tariffs are being met and will continue to be met. Proactive activities may include identifying current and potential bottlenecks, inefficient or poorly performing components, potential failures, and others.

A card that is in an OOS state will not necessarily result in a customer experiencing a service loss or noticing degraded service. A number of conditions can cause a card to be in an OOS state while not affecting the service provided to a customer. But, it is desirable to proactively return OOS cards to an in-sync state before the OOS condition results in a customer experiencing degraded service or a loss of service.

A customer tariff typically provides the network operators with a periodic maintenance window during which the network operator can take down a customer's service to perform maintenance activities. For example, a tariff may provide that on Tuesday mornings from 2 AM to 4 AM the network operator can disrupt services to perform maintenance activities. Preferably, it is during these maintenance windows that the network operator would want to clear up the OOS conditions found with cards in the network.

An OOS condition with a card is typically corrected by performing a task known as PRAMing wherein the EMS causes the information loaded in the PRAM of the OOS card to be cleared and wherein the EMS downloads to the OOS card the parameter information for that card that is stored in the EMS database.

Figure 5:
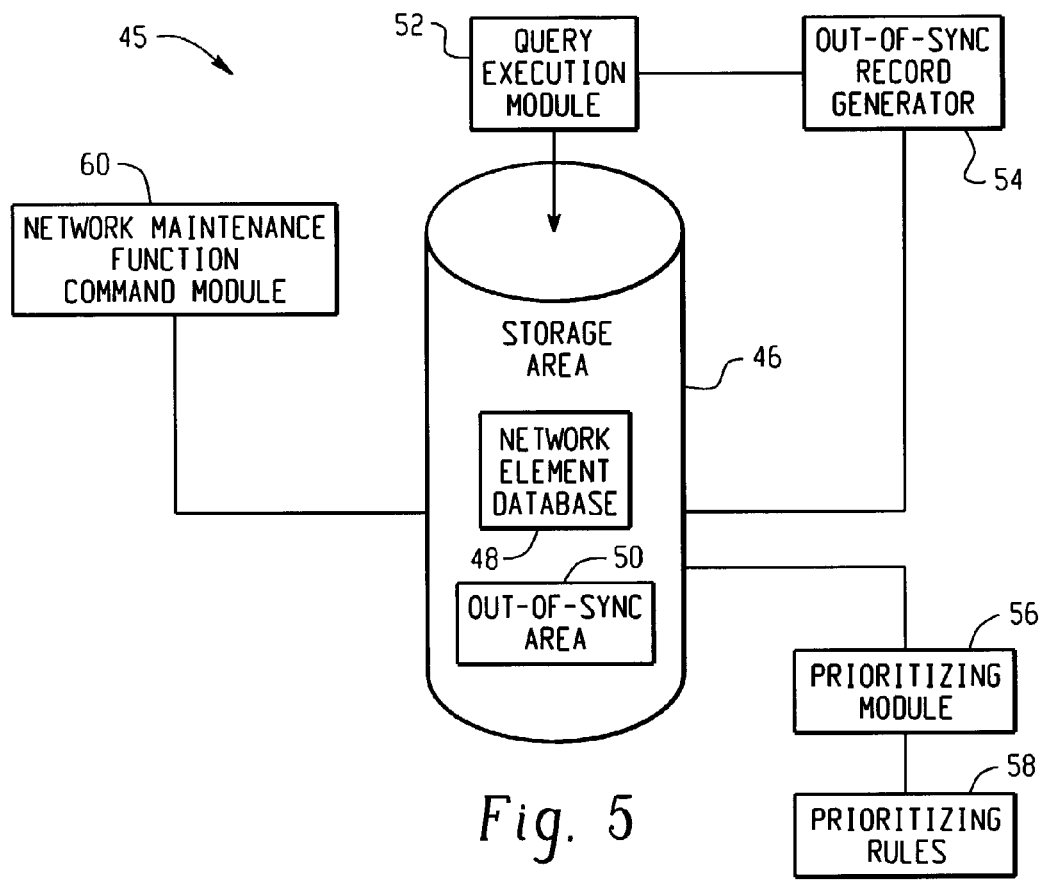
FIG. 5 is an schematic diagram of a preferred maintenance system.

Illustrated in FIG. 5, is an exemplary planned maintenance system 45 for PRAMing or clearing OOS cards during the maintenance window. In the description that follows the term module is used. The term module as used herein is a generic term used to describe any entity such as hardware, software, firmware, or a combination of the above that causes the execution of some function.

The maintenance system 45 preferably is implemented within the EMS 24. The maintenance system 45 uses a storage area 46 which preferably contains a network element database 48 and a OOS area 50 for storing information regarding OOS cards.

The maintenance system 45 includes a query execution module 52 that searches through the network element database to identify cards that are indicated to be in an OOS state. The query execution module 52 preferably performs this task periodically and more preferably weekly in advance of the next maintenance window.

The maintenance system 45 also includes an OOS record generator 54 that interfaces with the query execution module 52. The OOS record generator 54 receives the output from the query execution module 52 and, based on the OOS cards identified, generates a record or file in the OOS area 50 in which the identity of all of the cards that are in an OOS state are recorded.

The maintenance system 45 also preferably includes a prioritizing module 56. The prioritizing module 56, in accordance with prioritizing rules 58, assigns to each of the identified OOS cards in the OOS area 50 a priority level. The preferred prioritizing rules 10 require that the card with the highest bandwidth be given the highest priority and the card with the next highest bandwidth be given the next highest priority. If two cards provide the same bandwidth, then the card that has been OOS longest is given the higher priority. Other prioritizing rules could be applied such as prioritizing based on cards that service particular customers or other rules.

After the OOS cards have been prioritized, a network maintenance function command module 60 at the start of a maintenance window will begin to issue commands to clear the OOS cards and to download the proper parameters into the PRAM of the OOS cards beginning with the highest priority OOS card and ending with the lowest priority OOS card or the ending of the maintenance window. In accordance with this preferred PRAMing scheme, if there is not enough time to PRAM all of the OOS cards during the maintenance window, the highest priority cards would have been PRAMed. The remaining OOS cards could possibly be PRAMed in the next maintenance window.

Figures 6, 7:
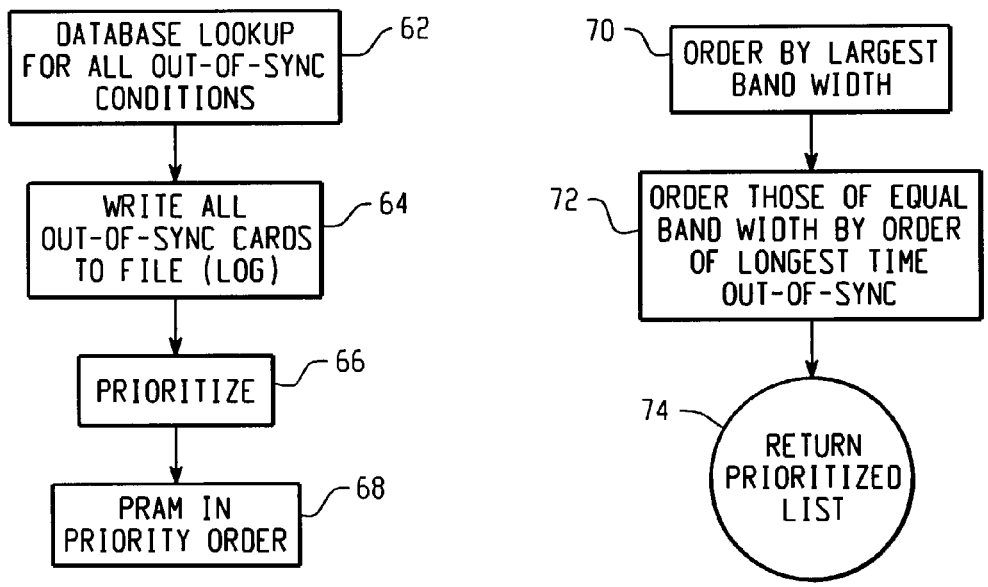
FIG. 6 is a flow chart illustrating a preferred method for bringing out of sync ("OOS") cards in a network into sync.
FIG. 7 is a flow chart that illustrates a preferred method for prioritizing the list of OOS cards.

FIG. 6 is a flow chart illustrating a preferred method for causing OOS cards in a network to be put into an in-sync state during a maintenance window. In step 62, a database lookup is conducted with the EMS to identify all cards that exhibit an OOS condition. In step 64, the identity of all of the OOS cards are recorded preferably in a file. In step 66, the listed OOS cards are prioritized based on prioritizing rules. Finally, in step 68, during a maintenance window, the OOS cards are downloaded with appropriate parameters to bring the cards into an in-sync state.

FIG. 7 is a flow chart that illustrates a preferred method for prioritizing the listing of OOS cards. In step 70, the cards are prioritized in a manner that provides that the card with the highest bandwidth traffic is given the highest priority and the card with the next highest bandwidth traffic is given the next highest priority. In step 72, cards of equal bandwidth are prioritized in a manner that provides that the card that has been in an OOS state the longest is given the higher priority. After all the cards have been prioritized, a prioritized list is provided (step 74).

Figure 8:
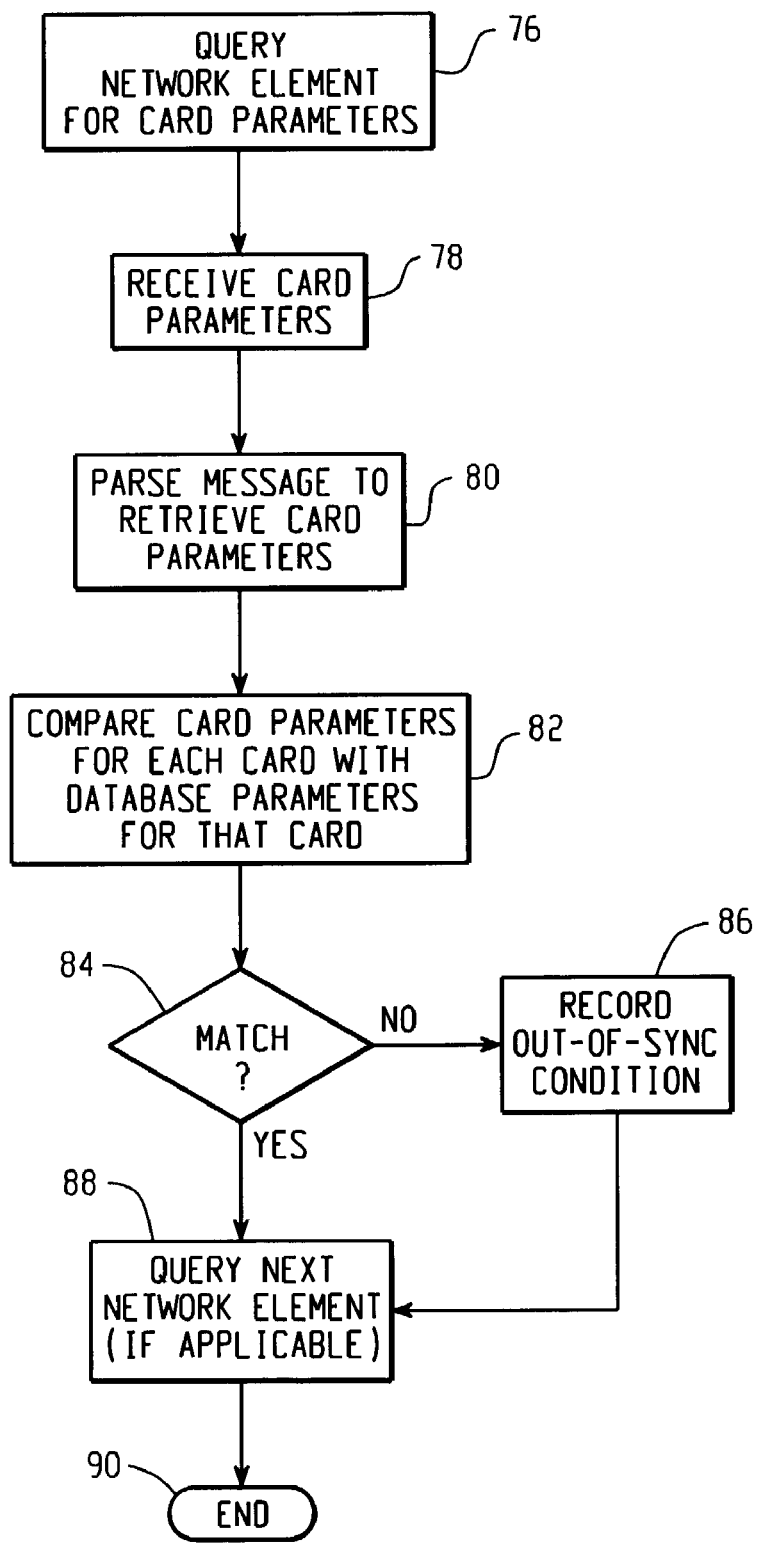
FIG. 8 is a flow chart illustrating an exemplary method for identifying cards in a network that are in an OOS condition.

FIG. 8 is a flow chart illustrating an exemplary method for identifying cards in a network that are in an OOS condition. In step 76, the EMS queries a network element for card parameters. In step 78, the EMS receives from the network element, the card parameters for each card in the network element. In step 80, the EMS retrieves the card parameters from the message from the network element. In step 82, the EMS compares the card parameters for each card with its database parameters for that card. If there is not a match, the EMS records the OOS condition (step 86). Preferably the OOS condition is recorded in the component file in the EMS database that corresponds to the OOS card. The EMS is then ready to query another network element for card parameters (step 88) or stop (step 90). If there is a match between the card parameters for a card and the database parameters for that card, the EMS can either query another network element for card parameters (step 88) or stop (step 90). When another network element is queried, the process is repeated beginning at step 76.

Figure 9:
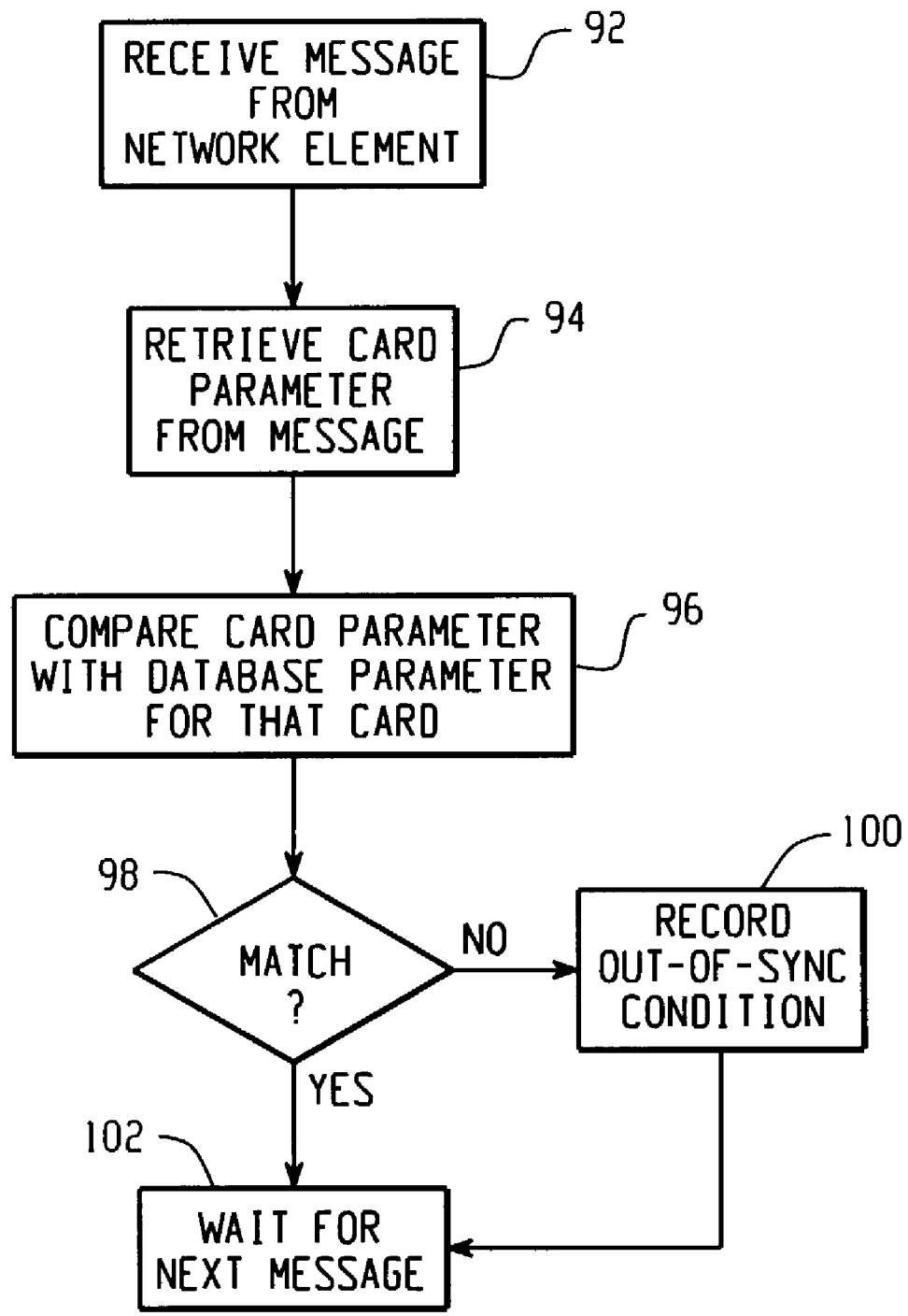
FIG. 9 is a flow chart illustrating another exemplary method for identifying cards in a network that are in an OOS condition.

FIG. 9 is a flow chart that illustrates another exemplary method for identifying cards in a network that are in an OOS condition. In step 92, the EMS receives from a network element, the card parameters for each card in a network element. In step 94, the EMS retrieves the card parameters from the message from the network element. In step 96, the EMS compares the card parameters for each card with its database parameters for that card. If there is not a match, the EMS records the OOS condition (step 100). Preferably the OOS condition is recorded in the component file in the EMS database that corresponds to the OOS card. The EMS then waits for the next network element to send card parameters (step 102). If when comparing card parameters and database parameters for that card there is a match, then the EMS waits for the next network element to send card parameters (step 102). When another network element sends card parameters, the process is repeated beginning at step 92.

Other variations from these systems and methods should become apparent to one of ordinary skill in the art without departing from the scope of the invention defined by the claims. The embodiments described herein and shown in the drawings are examples of structures, systems or methods having elements corresponding to the elements of the invention recited in the claims. This written description and drawings may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

The invention claimed is:

1. A computer-implemented system for planning maintenance activities in a communication network, the system comprising:

a query execution module that is operative to search a database to identify elements in the network that are out of sync;

an out of sync record generator module having a data path to the query execution module, the out of sync record generator being operative to record the identity of elements identified by the query execution module as being out of sync elements; and a network maintenance function command module that is operative to issue a series of commands, wherein the series of commands comprise commands to reload a PRAM in the out of sync elements, wherein each command is operative to cause one of the out of sync elements to become in sync, the command module being operative to issue the commands during a scheduled maintenance window.

2. The system according to claim 1 wherein the query execution module searches the database periodically and prior to the next maintenance window.

3. The system according to claim 1 wherein the network maintenance function command module issues a command for each of the out of sync elements during a single maintenance window.

4. The system according to claim 1 wherein the query execution module identifies two or more out of sync elements, wherein the network maintenance function command module does not issue a command for each of the two or more out of sync elements during a single maintenance window.

5. A computer-implemented system for planning maintenance activities in a communication network, the system comprising:
- a query execution module that is operative to search a database to identify elements in the network that are out of sync;
- an out of sync record generator module having a data path to the query execution module, the out of sync record generator being operative to record the identity of elements identified by the query execution module as being out of sync elements;
- a prioritizing module having a data path to the out of sync record generator module, the prioritizing module being operative to assign a priority value to the out of sync elements in accordance with prioritizing rules; and
- a network maintenance function command module that is operative to issue a series of commands wherein each command is operative to cause one of the out of sync elements to become in sync, the command module being operative to issue the commands in an order that corresponds to the priority value assigned to the out of sync elements by the prioritizing module, the command module being operative to issue the commands during a scheduled maintenance window.

6. The system according to claim 5 wherein the query execution module searches the database periodically and prior to the next maintenance window.

7. The system according to claim 5 wherein the series of commands comprise commands to reload the PRAM in the out of sync elements.

8. The system according to claim 5 wherein the prioritizing rules require that the element with the highest bandwidth be assigned the highest priority.

9. The system according to claim 8 wherein the prioritizing rules require that when two elements have the same bandwidth the element that has been out of sync the longest is assigned a higher priority.

10. The system according to claim 5 wherein the network maintenance function command module issues a command for each of the out of sync elements during a single maintenance window.

11. The system according to claim 5 wherein the network maintenance function command module does not issue a command for each of the out of sync elements during a single maintenance window.

12. An element management system for a communication network, comprising:
- a database;
- a query execution module that is operative to search the database to identify elements in the communication network that are out of sync;
- an out of sync record generator module having a data path to the query execution module, the out of sync record generator being operative to record the identity of elements identified by the query execution module as being out of sync elements; and
- a network maintenance function command module that is operative to issue a series of commands, wherein the series of commands comprise commands to reload a PRAM in the out of sync elements, wherein each command is operative to cause one of the out of sync elements to become in sync, the command module being operative to issue the commands during a scheduled maintenance window.

13. The system according to claim 12 wherein the query execution module searches the database periodically and prior to the next maintenance window.

14. The system according to claim 12 wherein the network maintenance function command module issues a command for each of the out of sync elements during a single maintenance window.

15. The system according to claim 12 wherein the query execution module identifies two or more out of sync elements, wherein the network maintenance function command module does not issue a command for each of the two or more out of sync elements during a single maintenance window.

16. An element management system for a communication network, comprising:
- a database;
- a query execution module that is operative to search the database to identify elements in the communication network that are out of sync;
- an out of sync record generator module having a data path to the query execution module, the out of sync record generator being operative to record the identity of elements identified by the query execution module as being out of sync elements;
- a prioritizing module having a data path to the out of sync record generator module, the prioritizing module being operative to assign a priority value to the out of sync elements in accordance with prioritizing rules; and
- a network maintenance function command module that is operative to issue a series of commands wherein each command is operative to cause one of the out of sync elements to become in sync, the command module being operative to issue the commands in an order that corresponds to the priority value assigned to the out of sync elements by the prioritizing module, the command module being operative to issue the commands during a scheduled maintenance window.

17. The system according to claim 16 wherein the query execution module searches the database periodically and prior to the next maintenance window.

18. The system according to claim 16 wherein the series of commands comprise commands to reload the PRAM in the out of sync elements.

19. The system according to claim 16 wherein the prioritizing rules require that the element with the highest bandwidth be assigned the highest priority.

20. The system according to claim 19 wherein the prioritizing rules require that when two elements have the same bandwidth the element that has been out of sync the longest is assigned a higher priority.

21. The system according to claim 16 wherein the network maintenance function command module issues a command for each of the out of sync elements during a single maintenance window.

22. The system according to claim 16 wherein the network maintenance function command module does not issue a command for each of the out of sync elements during a single maintenance window.

* * * * *